(12) United States Patent
Zhang et al.

(10) Patent No.: US 12,044,538 B2
(45) Date of Patent: Jul. 23, 2024

(54) METHOD AND APPARATUS FOR RECOMMENDING A CHARGING STATION

(71) Applicant: Volkswagen Aktiengesellschaft, Wolfsburg (DE)

(72) Inventors: Xin Zhang, Beijing (CN); Ning Duan, Beijing (CN); Wei Sun, Beijing (CN); Hang Gao, Beijing (CN); Weidong Liu, Beijing (CN)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 515 days.

(21) Appl. No.: 17/274,011

(22) PCT Filed: Sep. 6, 2019

(86) PCT No.: PCT/IB2019/001022
§ 371 (c)(1),
(2) Date: Mar. 5, 2021

(87) PCT Pub. No.: WO2020/049364
PCT Pub. Date: Mar. 12, 2020

(65) Prior Publication Data
US 2021/0310819 A1 Oct. 7, 2021

(30) Foreign Application Priority Data
Sep. 7, 2018 (CN) .......................... 201811043823.7

(51) Int. Cl.
*G01C 21/34* (2006.01)
*B60L 53/62* (2019.01)
*B60L 53/63* (2019.01)

(52) U.S. Cl.
CPC .......... *G01C 21/3476* (2013.01); *B60L 53/62* (2019.02); *B60L 53/63* (2019.02); *G01C 21/3484* (2013.01); *B60L 2240/62* (2013.01)

(58) Field of Classification Search
CPC . G01C 21/3476; G01C 21/3484; B60L 53/62; B60L 53/63; B60L 2240/62
See application file for complete search history.

(56) References Cited

U.S. PATENT DOCUMENTS

| | | | |
|---|---|---|---|
| 2015/0158393 A1* | 6/2015 | Kawano | G06Q 10/04 320/109 |
| 2017/0276503 A1 | 9/2017 | Oh et al. | |

FOREIGN PATENT DOCUMENTS

| | | | | |
|---|---|---|---|---|
| WO | 2020/049364 A2 | 3/2020 | ............. | G06Q 10/10 |

OTHER PUBLICATIONS

English Translation of CN 107133841 A Author: Wang et al. Title: A Charging Pile Site Recommendation Method and Device Date: Sep. 5, 2017 (Year: 2017).*

(Continued)

*Primary Examiner* — James J Lee
*Assistant Examiner* — Steven Vu Nguyen
(74) *Attorney, Agent, or Firm* — Slayden Grubert Beard PLLC (57) ABSTRACT

The present invention relates to method and apparatus for recommending a charging station, the method includes: determining, based on personal preference information of a user of an electric vehicle, a specific area reachable by the electric vehicle and suitable for charging the electric vehicle, when receiving a request for searching for a charging station for the electric vehicle; recommending a suitable charging station located in the specific area to the electric vehicle for (Continued)

charging. A suitable charging station may be recommended to the electric vehicle for charging with the method and apparatus.

13 Claims, 4 Drawing Sheets

(56) References Cited

OTHER PUBLICATIONS

English Translation of CN 107220781 B Author: Hou et al. Title: A Charging Facility Utilization Ratio Evaluating Method and Device Date: Sep. 29, 2017 (Year: 2017).*
English Translation of CN 104121921 A Author: Li et al. Title: An Electric Vehicle Charging Navigation Method, System and Related Device Date: Jun. 19, 2018 (Year: 2018).*
International Search Report and Written Opinion, Application No. PCT/IB2019/001022, 13 pages, Feb. 20, 2020.

* cited by examiner

METHOD AND APPARATUS FOR RECOMMENDING A CHARGING STATION

CROSS-REFERENCE TO RELATED APPLICATIONS

This application claims priority to Chinese Patent Application No. CN 201811043823.7, filed on Sep. 7, 2018 with the China National Intellectual Property Administration. The contents of the aforesaid Patent Application are incorporated herein for all purposes.

TECHNICAL FIELD

The present invention relates to the field of electric vehicles, and more particularly to a method and an apparatus for recommending a charging station.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Electric vehicles use electrical energy provided by batteries as power for endurance. Therefore, for electric vehicles, searching for and recommending a charging station may be very basic and important features.

Currently, charging stations are often treated as points of interest (POI), which are searched by navigation systems and recommended to electric vehicles.

However, existing searches for charging stations often occur with recommending unsuitable charging stations to electric vehicles for charging. For example, a user wants to park and charge near a park, but he/she is recommended to park and charge near a mall or a shopping center.

SUMMARY

Embodiments of the present invention provide a method, an apparatus, a computing device and a machine-readable storage medium for recommending charging stations, which are capable of recommending a suitable charging station to an electric vehicle for charging.

A method for recommending a charging station according to exemplary embodiments comprises: determining, based on personal preference information of a user of an electric vehicle, a specific area reachable by the electric vehicle and suitable for charging the electric vehicle, when receiving a request for searching for a charging station for the electric vehicle; recommending a suitable charging station located in the specific area to the electric vehicle for charging.

An apparatus for recommending a charging station according to exemplary embodiments comprises: a first determination module for determining, based on personal preference information of a user of an electric vehicle, a specific area reachable by the electric vehicle and suitable for charging of the electric vehicle, when receiving a request for searching for a charging station for the electric vehicle; and a first recommendation module for recommending a suitable charging station located in the specific area to the electric vehicle for charging.

A device for recommending a charging station according to exemplary embodiments comprises: a processor; and a memory having executable instructions stored thereon that, when executed, cause the processor to perform the aforementioned method.

A machine-readable storage medium according to exemplary embodiments has executable instructions stored thereon that, when executed, cause a machine to perform the aforementioned method.

Exemplary embodiments discussed herein are configured to recommend a charging station to an electric vehicle for charging in accordance with personal preference information of a user of the electric vehicle.

BRIEF DESCRIPTION OF THE DRAWINGS

Characteristics, features, advantages and benefits of the present invention will become more apparent from the description below in conjunction with the accompanying drawings, wherein.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
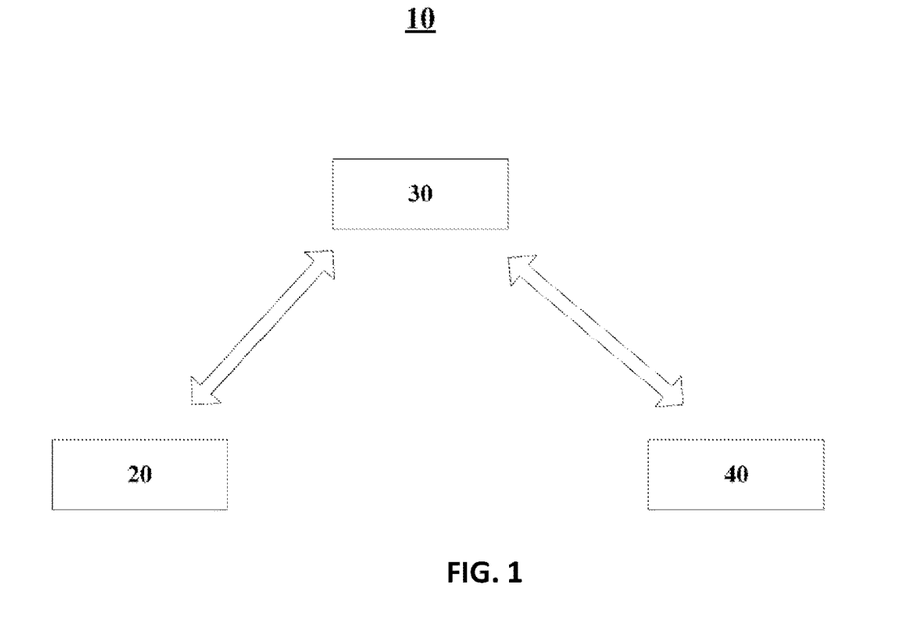
FIG. 1 shows an architectural schematic diagram of a system for recommending a charging station in accordance with some embodiments.

FIG. 1 shows an architectural schematic diagram of a system for recommending a charging station in accordance with some embodiments. As shown in FIG. 1, a system 10 for recommending a charging station may comprise a monitoring device 20, a server 30, and a client device 40. The server 30 communicates with the client device 40 in a wireless manner, and the server 30 may communicate with the monitoring device 20 in a wired or wireless manner.

The monitoring device 20 is located in a charging station and each charging station has a monitoring device 20. The monitoring device 20 utilizes sensors or the like to collect and store charging time, occupancy time, and current statuses for each charging pile in the charging station where it is located. The charging time of a charging pile refers to the total accumulation time of the charging pile that occupied by vehicles for charging within a certain period of time (for example, but not limited to, one month, one quarter, half a year or one year, etc.). The occupancy time of a charging pile refers to the total accumulation time of the charging pile that occupied by the vehicle for charging and parking within a certain period of time. When a charging pile is currently being occupied by a vehicle for charging or parking, the current status of the charging pile is occupied, and when a charging pile is not currently being occupied by a vehicle, the current status of the charging pile is idle.

In one exemplary aspect, the monitoring device 20 periodically observes the status (idle or occupied) of each charging pile of the charging station ST where it is located in each of a plurality of observation windows, and counts the number of times that each charging pile of the charging station ST is observed to be idle in each period ZQi, and then a false idle index FFi of a given charging pile STi in the charging station ST is calculated according to the following equation.

$$FFi = \sum_{j=1, j \neq i}^{n} p(i) * \log\left(\frac{p(j)}{p(i)}\right)$$

Wherein, p(i) represents the number of times that the charging pile STi is observed to be idle in the period ZQi, p(j) represents the number of times that each of the charging piles other than the charging pile STi of the charging station ST is observed to be idle in the period ZQi, and n represents the number of charging piles of the charging station ST. The greater the false idle index FFi, the greater the likelihood that the charging pile STi will be occupied for some unknown reasons. If the false idle index of the charging pile STi is greater than a specified false threshold, the monitoring device 20 may utilize the occupancy time of charging piles other than the charging pile STi of the charging station ST to correct the occupancy time of the charging pile STi, for example, but not limited to, the average of the occupancy time of each of charging piles other than the charging pile STi of the charging station ST may be calculated as the occupancy time of the charging pile STi.

The server 30 is used to periodically acquire the charging time, occupancy time, and current statuses of respective charging piles of respective charging stations from the monitoring device 20 of the respective charging stations. The server 30 utilizes the acquired charging time and occupancy time of a given charging pile CTi to calculate the charging round of the charging pile CTi, which is equal to a ratio of the charging time to the occupancy time of the charging pile CTi. The server 30 utilizes the calculated charging round of the charging pile CTi and the acquired current status of the charging pile CTi to update the charging round and current status of the charging pile CTi stored in the server 30.

The client device 40 is located in an electric vehicle and each electric vehicle has a client device 40. When the electric vehicle EVi is to be charged, the client device 40i located in the electric vehicle EVi determines an area reachable by the electric vehicle EVi and suitable for charging the electric vehicle EVi based on the personal preference information of the user of the electric vehicle EVi. The client device 40i then determines the charging intent of the electric vehicle EVi, which may be either charge-and-go or charge-and-park. Then, the client device 40i searches for charging stations located in the determined area to find a plurality of candidate charging stations. The client device 40i acquires, from the server 30, the charging rounds and current statuses of respective charging piles of each of the plurality of candidate charging stations. Based on the charging intent of the electric vehicle EVi and the acquired charging rounds and current statuses, the client device 40i recommends a suitable one of the plurality of candidate charging stations to the electric vehicle EVi for charging. For example, but not limited to, the client device 40 may be a navigation device, an onboard computer, or any other suitable device on an electric vehicle.

Figure 2:
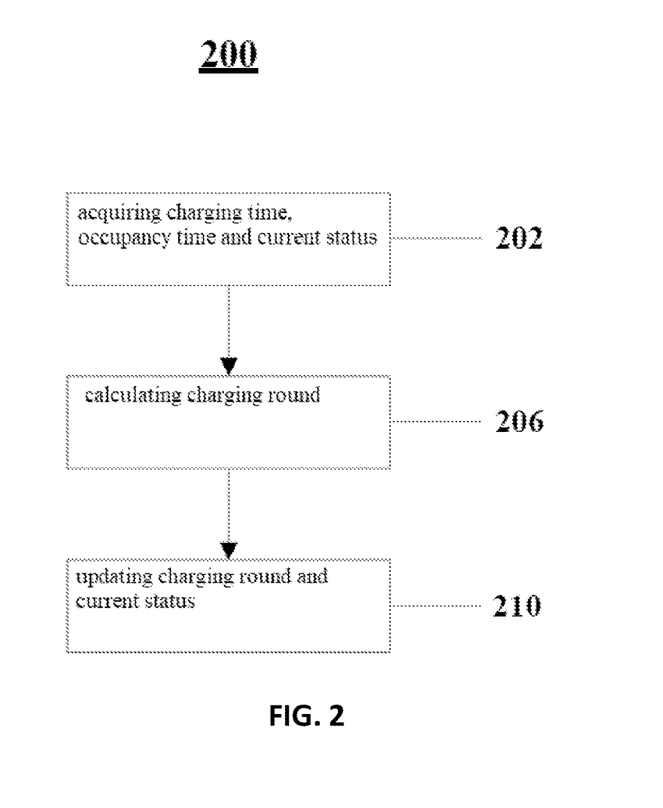
FIG. 2 shows an overall flow chart of a method for information update in accordance with some embodiments.

FIG. 2 shows an overall flow chart of a method for information update in accordance with some embodiments. The method 200 of FIG. 2 will be described below in detail in conjunction with the system 10 shown in FIG. 1.

As shown in FIG. 2, at block 202, the server 30 periodically acquires the charging time, occupancy time, and current statuses of respective charging piles of respective charging stations from the monitoring devices 20 of respective charging stations.

At block 206, the server 30 calculates a ratio of the charging time to the occupancy time of a given charging pile CTi as the charging round of the charging pile CTi.

At block 210, the server 30 utilizes the calculated charging round of the charging pile CTi and the acquired current status of the charging pile CTi to update the charging round and current status of the charging pile CTi stored in the server 30.

Figure 3:
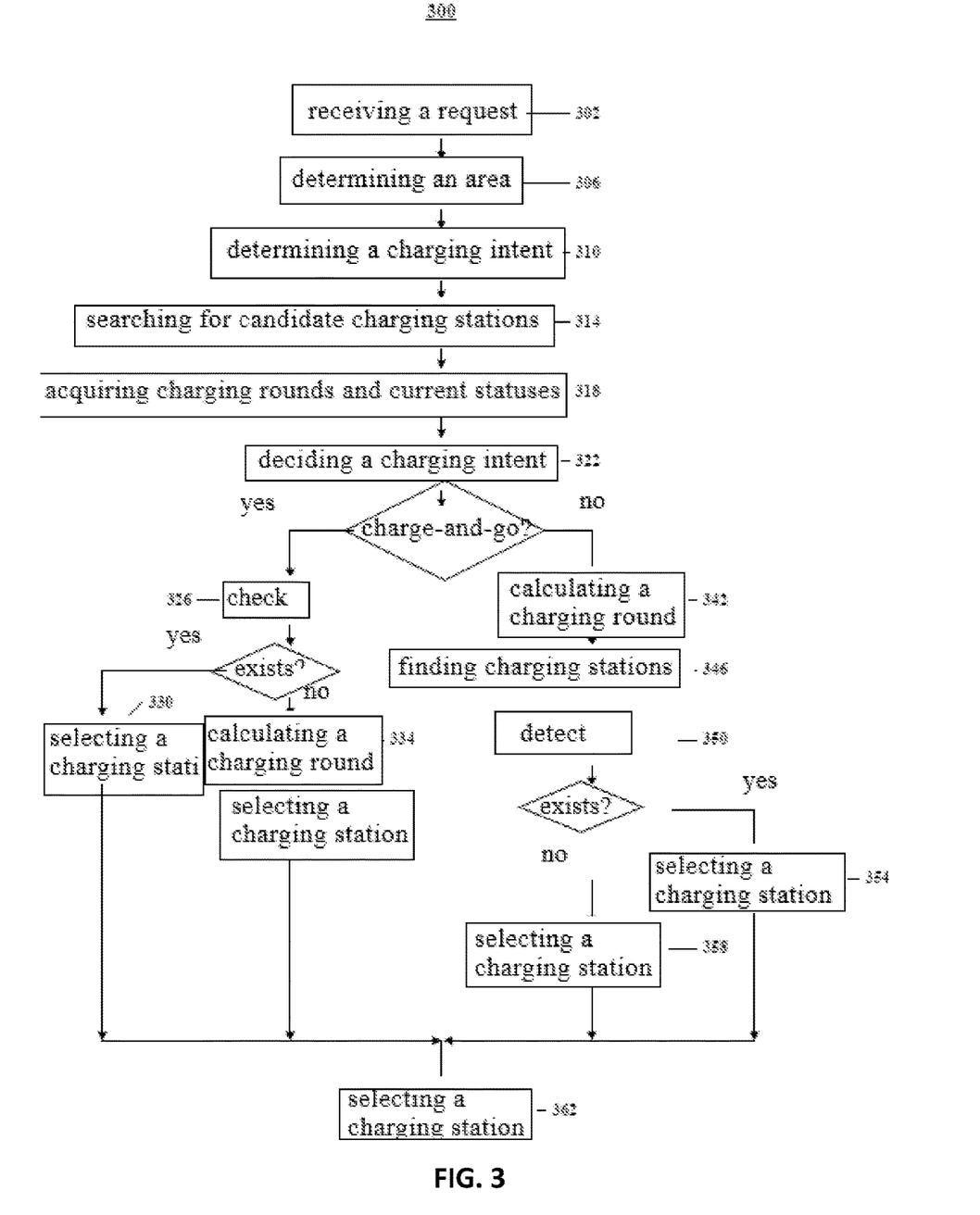
FIG. 3 shows an overall flow chart of a method for recommending a charging station in accordance with some embodiments.

FIG. 3 shows an overall flow chart of a method for recommending a charging station in accordance with some embodiments. The method 300 of FIG. 3 is described in detail below in conjunction with the system 10 shown in FIG. 1.

As shown in FIG. 3, at block 302, the client device 40j of the electric vehicle W receives a request Q for searching for a charging station for the electric vehicle W. For example, but not limited to, the request Q may be input into the client device 40j by the user (driver or passenger, etc.) of the electric vehicle W, or may be sent to the client device 40j by the onboard computer of the electric vehicle W based on the remaining battery power of the electric vehicle W.

At block 306, after receiving the request Q, the client device 40j determines an area CA reachable by the electric vehicle W and suitable for charging the electric vehicle W based on personal preference information PPI of the user of the electric vehicle W. Here, the personal preference information PPI indicates the personal preferences of the user of the electric vehicle W with regard to parking and charging, and the determined area CA matches the personal preference information PPI. For example, if the personal preference information PPI indicates that the user of the electric vehicle W prefers to park and charge in or near a park, the area CA will be an area containing a park. For another example, if the personal preference information PPI indicates that the user of the electric vehicle W prefers to park and charge in or near a shopping mall, the area CA will be an area containing a shopping mall. As an example, but not limited to, the personal preference information PPI may be pre-set by the user of the electric vehicle W or may be derived from the historical parking and charging record statistics of the electric vehicle W.

At block 310, the client device 40j determines the charging intent of the electric vehicle W. The charging intent may be either charge-and-go or charge-and-park. Charge-and-go means that an electric vehicle will leave after being fully charged at a charging pile and will not park in place at the charging pile, so that other electric vehicles may subsequently use the charging pile for charging. Charge-and-park means that an electric vehicle will not leave after being fully charged at a charging pile, but continues to park in place, and thus, subsequently, other electric vehicles cannot use the charging pile for charging.

In one exemplary aspect, the client device 40j may determine the charging intent of the electric vehicle W with the remaining battery power of the electric vehicle W. For example, but not limited to, if the remaining battery power of the electric vehicle W is still greater than 80% of the total amount of power when receiving the request Q, it may be determined that the charging intent of the electric vehicle W is charge-and-park, because the remaining power being greater than 80% of the total amount of power indicates that the battery power of the electric vehicle W is still sufficient, and it is not necessary indeed to charge the battery, and therefore in this case, the purpose of searching for a charging station is obviously to find a place to park, and by the way charge the vehicle while parking.

In one exemplary aspect, in the case when the electric vehicle W is currently traveling based on a navigation route, the client device 40j may determine the charging intent of the electric vehicle W with the navigation route of the electric vehicle W. Specifically, if the position of the electric vehicle W when receiving the request Q is not near the destination of the navigation route, it may be determined that the charging intent of the electric vehicle W is charge-and-go, and if the position of the vehicle W when receiving the request Q is or near the destination of the navigation route, it may be determined that the charging intent of the electric vehicle W is charge-and-park.

In one exemplary aspect, in the case when the electric vehicle W is currently traveling without using a navigation route, the client device 40j may determine the charging intent of the electric vehicle W with the historical travel trajectories of the electric vehicle W. For example, if the position of the electric vehicle W when receiving the request Q is in the area where the electric vehicle W frequently arrives and parks in the historical travel trajectories of the electric vehicle W, it may be determined that the charging intent of the electric vehicle W is charge-and-park.

In one exemplary aspect, in the case when the electric vehicle W is currently traveling without using a navigation route, the client device 40j may determine the charging intent of the electric vehicle W with the historical travel trajectory and the remaining battery power of the electric vehicle W. For example, but not limited to, if the position of the electric vehicle W when receiving the request Q is not in the area where the electric vehicle W frequently arrives and parks in the historical travel trajectories of the electric vehicle W and the remaining battery power of the electric vehicle W is less than 30% of the total amount of power, it may be determined that the charging intent of the electric vehicle W is charge-and-go.

In one exemplary aspect, after receiving the request Q, the client device 40j may allow the user of the electric vehicle W to input or select the charging intent of the electric vehicle W, thereby determining the charging intent of the electric vehicle W.

At block 314, the client device 40j searches for charging stations located in the area CA to acquire a plurality of candidate charging stations.

At block 318, the client device 40j acquires from the server 30 the charging rounds and current statuses of respective charging piles contained in each of the plurality of candidate charging stations.

At block 322, the client device 40j decides if the charging intent of the electric vehicle W is charge-and-go.

At block 326, if the decision result of block 322 is true, that is, the charging intent of the electric vehicle W is charge-and-go, the client device 40j then checks, in accordance with the current statuses of respective charging piles contained in each of the plurality of candidate charging stations, whether there is at least one charging station AL in the plurality of candidate charging stations, wherein each of the at least one charging station AL contains a plurality of charging piles that are currently in an idle status.

At block 330, if the check result of block 326 is true, the client device 40j selects the charging station closest to the electric vehicle W from the at least one charging station AL as the charging station recommended to the charging vehicle W, and then the flow proceeds to block 362.

At block 334, if the check result of block 326 is false, the client device 40j calculates the charging round of each of the plurality of candidate charging stations based on the charging rounds of respective charging piles contained in each of the plurality of candidate charging stations, wherein the charging round of each candidate charging station is equal to an average of the charging rounds of respective charging piles in the candidate charging station.

At block 338, the client device 40j selects the charging station from the plurality of candidate charging stations having the largest charging round as the charging station recommended to the charging vehicle W, and the flow proceeds to block 362.

At block 342, if the decision result of block 322 is false, that is, the charging intent of the electric vehicle W is charge-and-park, the client device 40j calculates the charging round of each of the plurality of candidate charging stations based on the charging rounds of respective charging piles contained in each of the plurality of candidate charging stations, wherein the charging round of each candidate charging station is equal to an average of the charging rounds of respective charging piles in the candidate charging station.

At block 346, the client device 40j finds from the plurality of candidate charging stations the charging station FD having a charging round less than the charging round threshold CLT. Here, the charging round threshold CLT is appropriately set such that all of the charging stations having a charging round less than the charging round threshold CLT belong to chargeable and parkable charging stations, and all of the charging stations having a charging round no less than the charging round threshold CLT belong to chargeable and unparkable charging stations.

At block 350, the client device 40j detects, based on the current statuses of respective charging piles of each of the found charging stations FD, whether there is one or more charging stations among the found charging stations FD each containing a plurality of charging piles that are currently in an idle status.

At block 354, if the detection result of block 350 is true, the client device 40j selects the charging station closest to the charging vehicle W from the one or more charging stations as the charging station recommended to the charging vehicle W, and then the flow proceeds to block 362.

At block 358, if the detection result of block 350 is false, the client device 40j selects the charging station having the largest charging round from the found charging stations FD as the charging station recommended to the charging vehicle W, and then the flow proceeds to block 362.

At block 362, the client device 40j presents the recommended charging station to the user of the charging vehicle W.

The solution of the present embodiments recommends a charging station to an electric vehicle for charging based on the personal preference information of the user of the electric vehicle, the charging intent of the electric vehicle, and the charging round characterizing the use of the charging station. Therefore, the solution of the present embodiments may recommend a suitable charging station to an electric vehicle for charging.

Other Variants

It should be appreciated by those skilled in the art that although in the above embodiments, the charging round of a charging pile is calculated by the server 30, the present invention is not limited thereto. In some other embodiments, the charging round of a charging pile may also be calculated and stored by the monitoring device 20 periodically using the charging time and occupancy time of the charging pile. In that case, the server 30 periodically acquires the charging rounds and current statuses of respective charging piles of respective charging stations from the monitoring devices 20 of respective charging stations, and utilizes the acquired charging rounds and current statuses of respective charging piles to update the charging rounds and current statuses of respective charging piles stored in the server 30.

It should be appreciated by those skilled in the art that although in the above embodiments, the operations of blocks 302-362 are implemented by client device 40j, the present invention is not limited thereto.

In some other embodiments, the operations of block 302-362 may also be implemented by the server 30. In that case, the client device 40j receives a request Q and sends it to the server 30, and after the server 30 has selected the charging station to be recommended to the electric vehicle W for charging, the server 30 sends the selected charging station to the client device 40j, and then the client device 40j presents the received charging station to the user of the electric vehicle W.

It should be appreciated by those skilled in the art that although in the above embodiments, a charging station is recommended to an electric vehicle for charging based on the personal preference information of the user of the electric vehicle, the charging intent of the electric vehicle, and the charging round characterizing the use of the charging station, the present invention is not limited thereto. In some other embodiments, a charging station may also be recommended to an electric vehicle for charging merely based on personal preference information of a user of the electric vehicle. In that case, the method 300 does not include blocks 310-358, and a suitable charging station in the area CA is recommended to the electric vehicle for charging in block 362.

Figure 4:
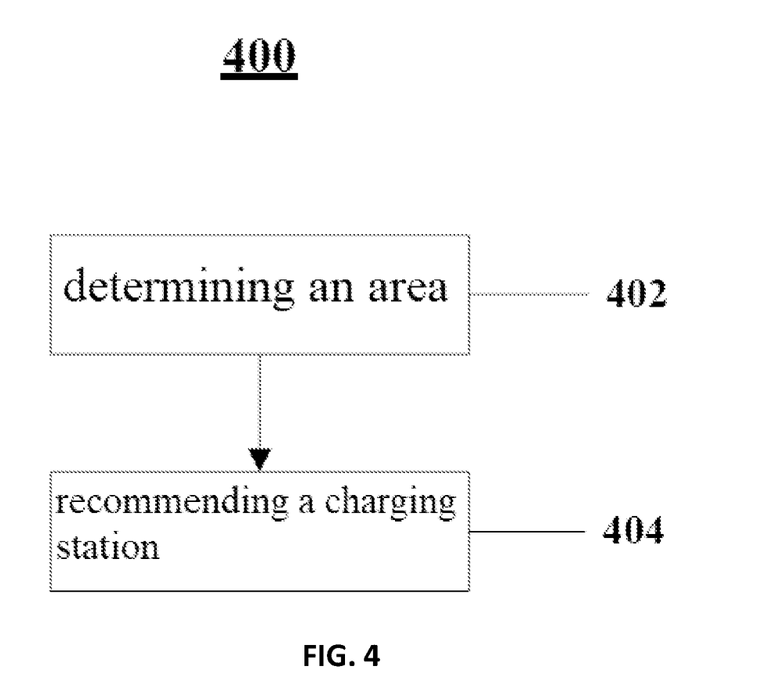
FIG. 4 shows a flow chart of a method for recommending a charging station in accordance with some embodiments.

FIG. 4 shows a flow chart of a method for recommending a charging station in accordance with some embodiments. The method 400 shown in FIG. 4 may be implemented by a client device 40, a server 30, or any other suitable devices.

As shown in FIG. 4, the method 400 may include, at block 402, determining, based on personal preference information of the user of an electric vehicle, a specific area reachable by the electric vehicle and suitable for charging the electric vehicle, when receiving a request for searching for a charging station for the electric vehicle.

The method 400 may further include, at block 404, recommending a suitable charging station located in the specific area to the electric vehicle for charging.

In a first exemplary aspect, block 404 includes: determining a charging intent of the electric vehicle; searching for charging stations located in the specific area to acquire a plurality of candidate charging stations; acquiring the charging rounds and current statuses of respective charging piles of each of the plurality of candidate charging stations, wherein the charging round of each charging pile represents a ratio of the charging time to the occupancy time of the charging pile, and the current status of each charging pile represents whether the charging pile is currently idle or not; and recommending a suitable charging station of the plurality of candidate charging stations to the electric vehicle for charging based on the determined charging intent and the acquired charging rounds and current statuses.

In a second exemplary aspect, recommending a suitable charging station of the plurality of candidate charging stations to the electric vehicle for charging includes: if the determined charging intent is charge-and-go, checking, based on the acquired current statuses, whether there is at least one charging station in the plurality of candidate charging stations, wherein each of the at least one charging station contains a plurality of charging piles that are currently idle; and selecting the charging station closest to the electric vehicle from the at least one charging station to recommend to the electric vehicle if the check result is true.

In a third exemplary aspect, recommending a suitable charging station of the plurality of candidate charging stations to the electric vehicle for charging further includes: if the check result is false, calculating, based on the acquired charging rounds, a charging round of each of the plurality of candidate charging stations, wherein the charging round of each candidate charging station represents an average of the charging rounds of respective charging piles in the candidate charging station; and selecting, from the plurality of candidate charging stations, the charging station having the largest charging round to recommend to the electric vehicle.

In a fourth exemplary aspect, recommending a suitable charging station of the plurality of candidate charging stations to the electric vehicle for charging includes: if the determined charging intent is charge-and-park, calculating, based on the acquired charging rounds, a charging round of each of the plurality of candidate charging stations, wherein the charging round of each candidate charging station represents an average of the charging rounds of respective charging piles in the candidate charging station; finding, from the plurality of candidate charging stations, charging stations having a charging round less than a charging round threshold; detecting, based on the acquired current statuses, whether there are one or more charging stations in the found charging stations each containing a plurality of charging piles that are currently idle; and if the detection result is true, selecting the charging station closest to the electric vehicle from the one or more charging stations to recommend to the electric vehicle.

In a fifth exemplary aspect, recommending a suitable charging station of the plurality of candidate charging stations to the electric vehicle for charging further includes: if the detection result is false, selecting, from the found charging stations, the charging station having the largest charging round to recommend to the electric vehicle.

In a sixth exemplary aspect, determining a charging intent of the electric vehicle includes: determining a charging intent of the electric vehicle based on remaining battery power of the electric vehicle, historical travel trajectories of the electric vehicle, and/or a navigation route of the electric vehicle.

Figure 5:
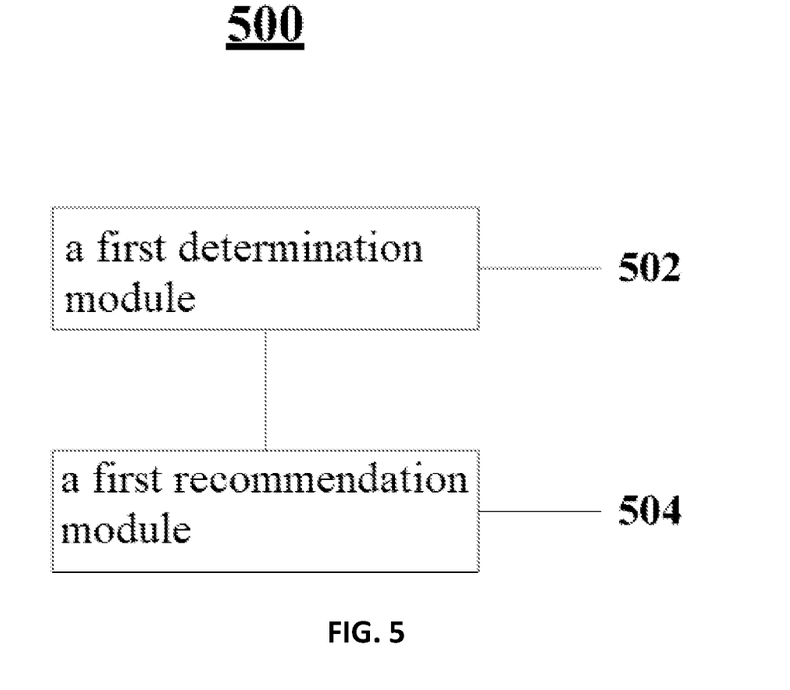
FIG. 5 shows a schematic diagram of an apparatus for recommending a charging station in accordance with some embodiments.

FIG. 5 shows a schematic diagram of an apparatus for recommending a charging station in accordance with some embodiments. The apparatus 500 shown in FIG. 5 may be implemented in software, hardware, or a combination thereof. The apparatus 500 may be installed in a client device 40, a server 30 or any other suitable devices.

As shown in FIG. 5, the apparatus 500 may include a first determination module 502 and a first recommendation module 504. The first determination module 502 is used to determining, based on personal preference information of a user of an electric vehicle, a specific area reachable by the electric vehicle and suitable for charging the electric vehicle, when receiving a request for searching for a charging station for the electric vehicle. The first recommendation module 504 is used to recommend a suitable charging station located in the specific area to the electric vehicle for charging.

In a first exemplary aspect, the first recommendation module 504 includes: a second determination module, which is used to determine a charging intent of the electric vehicle; a searching module, which is used to search for charging stations located in the specific area to acquire a plurality of candidate charging stations; an acquiring module, which is used to acquire the charging rounds and current statuses of respective charging piles of each of the plurality of candidate charging stations, wherein the charging round of each charging pile represents a ratio of the charging time to the occupancy time of the charging pile, and the current status of each charging pile represents whether the charging pile is currently idle or not; and a second recommendation module, which is used to recommend a suitable charging station of the plurality of candidate charging stations to the electric vehicle for charging based on the determined charging intent and the acquired charging rounds and current statuses.

In a second exemplary aspect, the second recommendation module may include: a first checking module, which is used to, if the determined charging intent is charge-and-go, check, based on the acquired current statuses, whether there is at least one charging station in the plurality of candidate charging stations each containing a plurality of charging piles that are currently idle; and a first selecting module, which is used to select the charging station closest to the electric vehicle from the at least one charging station to recommend to the electric vehicle if the check result is true.

In a third exemplary aspect, the second recommendation module may further include: a first calculating module, which is used to, if the check result is false, calculate, based on the acquired charging rounds, a charging round of each of the plurality of candidate charging stations, wherein the charging round of each candidate charging station represents an average of the charging rounds of respective charging piles in the candidate charging station; and a second selecting module, which is used to select, from the plurality of candidate charging stations, the charging station having the largest charging round to recommend to the electric vehicle.

In a fourth exemplary aspect, the second recommendation module may include: a second calculating module, which is used to, if the determined charging intent is charge-and-park, calculate, based on the acquired charging rounds, a charging round of each of the plurality of candidate charging stations, wherein the charging round of each candidate charging station represents an average of the charging rounds of respective charging piles in the candidate charging station; a finding module, which is used to find, from the plurality of candidate charging stations, charging stations of which the charging round is less than a charging round threshold; a detecting module, which is used to detect, based on the acquired current statuses, whether there are one or more charging stations in the found charging stations each containing a plurality of charging piles that are currently idle; and a third selecting module, which is used to select the charging station closest to the electric vehicle from the one or more charging stations to recommend to the electric vehicle if the detection result is true.

In a fifth exemplary aspect, the second recommendation module may further include: a fourth selecting module, which is used to select, from the found charging stations, the charging station having the largest charging round to recommend to the electric vehicle if the detection result is false.

In a sixth exemplary aspect, the second determination module is further used to determine a charging intent of the electric vehicle based on remaining battery power of the electric vehicle, historical travel trajectories of the electric vehicle, and/or a navigation route of the electric vehicle.

Figure 6:
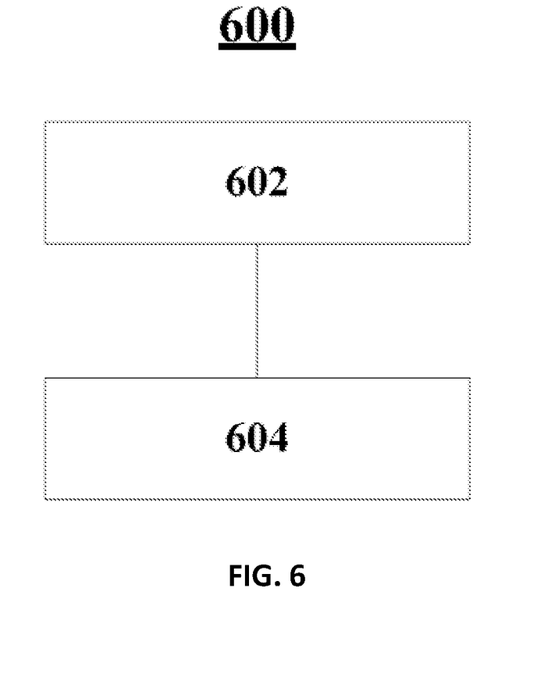
FIG. 6 shows a schematic diagram of a device for recommending a charging station in accordance with some embodiments.

FIG. 6 shows a schematic diagram of a device for recommending a charging station in accordance with some embodiments. The device 600 shown in FIG. 6 may be, for example, a client device 40, a server 30, or any other suitable devices.

As shown in FIG. 6, the device 600 may include a processor 602 and a memory 604, wherein the memory 604 stores executable instructions that, when executed, cause the processor 602 to perform the method 300 or the method 400.

Embodiments also provide a machine-readable storage medium having executable instructions stored thereon that, when executed, cause a machine to perform the method 300 or the method 400.

The embodiments described above in conjunction with the drawings illustrate exemplary embodiments, but are not intended to represent all embodiments that may be implemented or fall within the scope of the claims. The term "exemplary" used throughout the specification means "serving as an example, instance, or exemplification" and does not mean "preferred" or "having advantages" over other embodiments. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

The embodiments include specific details for the purpose of providing an understanding of the described techniques. However, these techniques may be implemented without these specific details. In some instances, well known structures and apparatuses are shown in block diagram in order to avoid obscuring the concepts of the described embodiments.

The above description of the disclosure is provided to enable any person skilled in the art to implement or use the present disclosure. Various modifications to the present disclosure will be obvious to those skilled in the art, and the general principles defined herein may be applied to other variants without departing from the scope of the disclosure. Therefore, the present disclosure is not limited to the examples and designs described herein, but is in accordance with the broadest scope of the principles and novel features disclosed herein.

What is claimed is:

1. A method for recommending a charging station to a user of an electric vehicle, comprising:
   determining personal preference information of the user of the electric vehicle, comprising information on a type of desired surroundings for parking and charging;
   determining, based on the personal preference information, a specific area reachable by the electric vehicle and suitable for charging the electric vehicle;
   determining a charging intent of the electric vehicle;
   searching for charging stations located in the specific area to acquire a plurality of candidate charging stations;
   acquiring charging rounds and current statuses of respective charging piles of each of the plurality of candidate charging stations, wherein the charging round of each charging pile represents a ratio of the charging time to an occupancy time of the charging pile, the current status of each charging pile represents whether the charging pile is currently idle or not, and the occupancy time refers to a total accumulation time of the charging pile occupied by vehicles for charging and parking within a certain period of time;
   recommending a suitable charging station of the plurality of candidate charging stations to the electric vehicle for charging based on the determined charging intent and the acquired charging rounds and current statuses; and
   presenting the recommended charging station to the user of the electric vehicle.

2. The method according to claim 1, wherein the recommending of the suitable charging station of the plurality of candidate charging stations to the electric vehicle for charging comprises:
   if the determined charging intent is charge-and-go, checking, based on the acquired current statuses, whether there is at least one charging station in the plurality of candidate charging stations each containing a plurality of charging piles that are currently idle; and
   if the check result is true, selecting the charging station closest to the electric vehicle from the at least one charging station to recommend to the electric vehicle.

3. The method according to claim 2, wherein the recommending of the suitable charging station of the plurality of candidate charging stations to the electric vehicle for charging further comprises:
   if the check result is false, calculating, based on the acquired charging rounds, a charging round of each of the plurality of candidate charging stations, wherein the charging round of each candidate charging station represents an average of the charging rounds of respective charging piles in the candidate charging station; and
   selecting, from the plurality of candidate charging stations, the charging station having the largest charging round to recommend to the electric vehicle.

4. The method according to claim 1, wherein the recommending of a suitable charging station of the plurality of candidate charging stations to the electric vehicle for charging comprises:
   if the determined charging intent is charge-and-park, calculating, based on the acquired charging rounds, a charging round of each of the plurality of candidate charging stations, wherein the charging round of each candidate charging station represents an average of the charging rounds of respective charging piles in the candidate charging station;
   finding, from the plurality of candidate charging stations, charging stations having a charging round less than a charging round threshold;
   detecting, based on the acquired current statuses, whether there are one or more charging stations in the found charging stations each containing a plurality of charging piles that are currently idle; and
   if the detection result is true, selecting the charging station closest to the electric vehicle from the one or more charging stations to recommend to the electric vehicle.

5. The method according to claim 4, wherein the recommending of a suitable charging station of the plurality of candidate charging stations to the electric vehicle for charging further comprises:
   if the detection result is false, selecting, from the found charging stations, the charging station having the largest charging round to recommend to the electric vehicle.

6. The method according to claim 1, wherein the determining of a charging intent of the electric vehicle comprises:
   determining a charging intent of the electric vehicle based on one or more of remaining battery power of the electric vehicle, historical travel trajectories of the electric vehicle, and a navigation route of the electric vehicle.

7. A non-transitory machine readable storage medium having executable instructions stored thereon that, when executed, cause a machine to perform the method of claim 1.

8. A client device having a processor and memory, wherein the memory stores executable instructions that, when executed, cause the processor to:
   determine personal preference information of the user of the electric vehicle, comprising information on a type of desired surroundings for parking and charging;
   determine, based on the personal preference information, a specific area reachable by the electric vehicle and suitable for charging the electric vehicle;
   determine a charging intent of the electric vehicle;
   search for charging stations located in the specific area to acquire a plurality of candidate charging stations;
   acquire charging rounds and current statuses of respective charging piles of each of the plurality of candidate charging stations, wherein the charging round of each charging pile represents a ratio of the charging time to an occupancy time of the charging pile, the current status of each charging pile represents whether the charging pile is currently idle or not, and the occupancy time refers to a total accumulation time of the charging pile occupied by vehicles for charging and parking within a certain period of time;
   recommend a suitable charging station of the plurality of candidate charging stations to the electric vehicle for charging based on the determined charging intent and the acquired charging rounds and current statuses; and
   present the recommended charging station to the user of the electric vehicle.

9. The client device of claim 8, wherein the memory stores executable instructions that, when executed, cause the processor additionally to:
   if the determined charging intent is charge-and-go, check, based on the acquired current statuses, whether there is at least one charging station in the plurality of candidate charging stations each containing a plurality of charging piles that are currently idle; and if the check result is true, select the charging station closest to the electric vehicle from the at least one charging station to recommend to the electric vehicle.

10. The client device of claim 9, wherein the memory stores executable instructions that, when executed, cause the processor additionally to:
if the check result is false, calculate, based on the acquired charging rounds, a charging round of each of the plurality of candidate charging stations, wherein the charging round of each candidate charging station represents an average of the charging rounds of respective charging piles in the candidate charging station; and
select, from the plurality of candidate charging stations, the charging station having the largest charging round to recommend to the electric vehicle.

11. The client device of claim 8, wherein the memory stores executable instructions that, when executed, cause the processor additionally to:
if the determined charging intent is charge-and-park, calculate, based on the acquired charging rounds, a charging round of each of the plurality of candidate charging stations, wherein the charging round of each candidate charging station represents an average of the charging rounds of respective charging piles in the candidate charging station;
find, from the plurality of candidate charging stations, charging stations having a charging round less than a charging round threshold;
detect, based on the acquired current statuses, whether there are one or more charging stations in the found charging stations each containing a plurality of charging piles that are currently idle; and
if the detection result is true, select the charging station closest to the electric vehicle from the one or more charging stations to recommend to the electric vehicle.

12. The client device of claim 11, wherein the memory stores executable instructions that, when executed, cause the processor additionally to:
if the detection result is false, select, from the found charging stations, the charging station having the largest charging round to recommend to the electric vehicle.

13. The client device of claim 8, wherein the memory stores executable instructions that, when executed, cause the processor additionally to:
determine a charging intent of the electric vehicle based on one or more of remaining battery power of the electric vehicle, historical travel trajectories of the electric vehicle, and a navigation route of the electric vehicle.

* * * * *